United States Patent Office 2,709,661
Patented May 31, 1955

2,709,661

PROCESS FOR THE PRODUCTION OF INDUSTRIAL SLURRIES OF REDUCED MOISTURE CONTENT IN RELATION TO VISCOSITY

Karl Dietz, Kronberg (Taunus), Germany, assignor to Farbwerke Hoechst Aktiengesellschaft vormals Meister Lucius und Bruning, Frankfurt, Germany, a company of Germany No Drawing. Application October 6, 1950,
Serial No. 188,875

Claims priority, application Germany October 17, 1949

7 Claims. (Cl. 106—100)

The present invention relates to a process for the production of industrial slurries of reduced moisture content in relation to viscosity.

In the case of slurries occurring in industry, such as slurries for cement manufacture, strontianite slurries obtained in sugar factories or the like, endeavors are made to diminish the necessary moisture content so as to avoid useless water ballast in the further treatment of the slurries, and in particular to save to as large an extent as possible the amount of heat necessary for the removal of water therefrom by evaporation. In such cases it is essential that the viscosity of the slurries be maintained at the customary value, or that, at least, it does not alter to such an extent that difficulties arise during the further treatment, especially during the passage of the slurries through pipe lines.

Various processes are already known which allow of decrease of the moisture content of slurries for cement manufacture while retaining substantially the same viscosity. Thus, many attempts have already been made to use, for this purpose, wetting agents or surface-active substances of various kinds, particularly organic compounds, which are closely related to the tanning agents; these substances have been used either per se or in combination with other substances of liquefying action. These attempts, however, involve the drawback that their action on slurries for cement manufacture is either limited by simultaneously occurring thixotropy phenomena or that their effectiveness is restricted to slurries of an exactly defined origin and composition, whereas with other slurries for cement manufacture they are of no value.

Now, I have found that it is possible to attain an effective reduction of the necessary moisture content of slurries produced in industrial operations, while retaining substantially the same viscosity, by incorporating in such slurries an alkali salt, such as a sodium or potassium salt, of an inorganic polyacid, for instance the alkali salts of polyphosphoric acids, polythiophosphoric acids, polysilicic acids, polymolybdic acids, polyvanadic acids, polyboric-phosphoric acids and others. The process consists in the application either of one or more of the aforenamed substances. For instance may be used sodium polyphosphates, such as $Na_6P_4O_{13}$ (sodium polyphosphate glass), sodium trithiophosphate ($Na_6P_4O_{10}S_3$), sodium polyvanadate of the general formula $(NaVO_3)_n$, sodium-boro-phosphates of the general formula $$(NaBO_3)_x(NaPO_3)_{yn}$$

sodium polymolybdates of the general formula $$(Na_2MoO_4)_x(MoO_3)_{yn}$$

and others, or the corresponding other alkali salts, such as the potassium salts. The poly-compounds are formed according to the processes generally known in the pertaining literature, by fusing together the corresponding individual constituents. The degree of polymerization, i. e. the respective value for $x$, $y$ and $n$ depends on the respective ratios of the constituents used and the degree of temperature applied during the fusing operation.

In some cases it has been found advisable to apply mixtures of several of these substances. In most cases the sodium salts are used, but the other alkali salts, in particular the potassium salts, may be used with similar results. The substance among the series of alkali salts of inorganic polyacids specified according to the present invention, which is preferable for use with a particular slurry and also the quantity to be applied, vary in each individual case, but they may easily be determined in each case according to the particular nature of the slurry to be treated. When, for instance, the moisture content of a slurry for cement manufacture is intended to be reduced by an addition as specified, it is of advantage that the slurry, after the addition of the agent, should show, for instance by the addition of sodium carbonate, a pH-value between about 6.5 and about 9.5.

According to the present invention quite small amounts and in some cases very small amounts of the aforesaid salts render possible a considerable reduction of the moisture content of the slurries while retaining practically the same viscosity. A quantity of about 0.003 per cent. by weight to about 0.1 per cent. by weight, and especially a quantity of 0.01 per cent. by weight to 0.02 per cent. by weight, calculated upon the quantity of the slurry, allows of a useful reduction of the moisture content for practical purposes.

Thixotropy phenomena, which frequently occur with disadvantage in the hitherto known processes, no longer do so when the additions specified according to the present invention are used. These additional substances maintain their efficacy when they are applied together with organic surface-active substances. By suitable admixture the efficiency of these organic surface-active agents may be considerably enhanced. The application of water-soluble methylene naphthalene sulfonates or the substitution products thereof has, for instance, been found of advantage. Methylene naphthalene sulfonates constitute bodies or are derived from bodies in which two naphthalene radicals substituted by $SO_3H$ are connected by a methylene bridge. They may, for instance, be obtained by the condensation of formaldehyde with naphthalene in the presence of a mixture of sulfuric acid and fuming sulfuric acid and the transformation of the condensation product obtained into the salt.

For instance, in a slurry for cement manufacture there may be used sodium polyphosphate, for example $Na_6P_4O_{13}$ (sodium polyphosphate glass), in a quantity of about 0.003 to about 0.02 per cent. by weight, calculated upon the quantity of slurry, together with a water-soluble methylene-naphthalene sulfonate, such as sodium methylene naphthalene sulfonate, likewise in a small quantity, for instance in an amount of about 0.02 per cent. by weight. In some cases, the further addition of sodium or potassium meta-silicate in a quantity of about 0.003 to about 0.05 per cent. by weight may be advantageous. By the addition of sodium carbonate in suitable quantities of 0.005 to 0.03 per cent, the efficiency of the mixtures may be further enhanced.

The substances to be used according to the present invention may in the case of slurries for cement manufacture be added at any desired moment during the production of the said slurries, that is, before or during the grinding of the rock material, or in the preparation of the slurry after the grinding. If the addition is made during the grinding of the rock material, there also results a considerable improvement of the comminuting capacity of the mill. This improvement is shown by a smaller particle size of the slurry.

The process of the present invention may be applied with advantage for the decrease of the water content of slurries for cement manufacture and also of other slurries, for instance of strontianite slurries obtained in the manufacture of sugar.

Thus about 0.003 to about 0.01 per cent. by weight of sodium or potassium polyphosphate and in some cases furthermore about 0.005 to about 0.05 per cent. by weight of sodium or potassium metasilicate may be added to the strontianite cake which has been eliminated by filtration. Furthermore, a water-soluble methylene naphthalene sulfonate, for example the ammonium salt, may be added in an amount of about 0.05 per cent. by weight. An addition of sodium carbonate in a suitable quantity of 0.005 to 0.03 per cent. likewise increases the efficiency of the mixtures.

The following examples serve to illustrate the invention, but they are not intended to limit it thereto, the parts being by weight:

Example 1

100 parts of a slurry obtained by the grinding of argillaceous limestone and having a water content of 32 per cent., which slurry is intended for the manufacture of cement, are mixed during or after the grinding with 0.02 part of sodium polyphosphate. The viscosity of this slurry having a water content of 32 per cent. and to which the aforesid addition has been made, corresponds to the viscosity of a normal slurry containing 38 per cent. of water, but no addition. By the addition a decrease of the moisture content of 38 per cent. to 32 per cent. has thus been rendered possible while maintaining the same viscosity. The slurry has a pH-value of 8.0.

Example 2

100 parts of a slurry of a water content of 30 per cent. obtained by the grinding of argillaceous limestone, which slurry is intended for the manufacture of cement, are mixed during or after the grinding with 0.01 part of sodium polyphosphate, 0.01 part of sodium meta-silicate, 0.01 part of sodium carbonate and 0.02 part of sodium methylene naphthalene sulfonate. The viscosity of the slurry containing 30 per cent. of water and the additions corresponds to the viscosity of a normal slurry containing 39 per cent. of water, but no additions. By the addition a decrease of the moisture content from 39 per cent. to 30 per cent. has thus been rendered possible while maintaining the same viscosity. The slurry has a pH-value of 8.8.

Example 3

100 parts of a strontianite cake eliminated by filtration from a saturation plant are mixed with water to form a slurry; to the water 0.01 part of sodium polyphosphate and 0.05 part of sodium metasilicate are previously added. An addition of 0.05 part of ammonium methylene naphthalene sulfonate and 0.05 part of sodium tetraphosphate may also be made. By these additions the water otherwise required for mixing the slurry may be reduced by 20 to 25 per cent.

Example 4

100 parts of a slurry of a water content of 29 per cent., obtained by the grinding of argillaceous limestone, which slurry is intended for the manufacture of cement, are mixed, after the grinding, with 0.015 part of sodium trithophosphate of the formula $Na_5P_4O_{10}S_3$, 0.02 part of sodium carbonate and 0.03 part of sodium methylene naphthalene sulfonate. The viscosity of the slurry having a water content of 29 per cent. and to which the aforesaid addition has been made, corresponds to the viscosity of a normal slurry having a water content of 37 per cent., but no additions. The moisture content is, thus, reduced from 37 per cent. to 29 per cent. The slurry has a pH-value of 8.4.

The polyphosphates as used herein refer to salts of the polyphosphoric acids, which acids have the general formula $mH_3PO_4-(m-1)H_2O$ and the salts include such members as sodium pyrophosphate $Na_4P_2O_7$ (m=2), sodium triphosphate $Na_5P_3O_{10}$ (m=3), sodium tetraphosphate $Na_6P_4O_{13}$ (m=4), and the like (Mellor's "Comprehensive Treatise on Inorganic and Theoretical Chemistry," vol. 8, 1928, pages 984–992). Consequently, the polyphosphoric acids are exclusive of the polymetaphosphoric acids which have the general formula $(HPO_3)_n$ and include as a representative member sodium hexametaphosphate $Na_6P_6O_{18}$ or $Na_6(PO_3)_6$.

I claim:

1. The process for the production of an aqueous slurry of comminuted argillaceous limestone material, which, upon burning, produces cement, said slurry being sufficiently fluid to pump and containing a quantity of water otherwise insufficient for the purpose, said process comprising admixing with said argillaceous limestone material present in said slurry at least one alkali metal salt selected from the group which consists of the alkali metal polyphosphates, the alkali metal polythiophosphates, the alkali metal polysilicates, the alkali metal polymolybdates, the alkali metal polyvanadates, and the alkali metal salts of polyboricpolyphosphoric acid; said salt being present in amounts ranging from 0.003 per cent to 0.1 per cent, said percentages being by weight, based on the total weight of said slurry; from about 0.02 per cent to about 0.03 per cent by weight of a soluble salt of methylene naphthalene sulfonic acid; and sufficient sodium carbonate to adjust the pH of the slurry to one within the range 6.5 to 9.5.

2. The process for the production of an aqueous slurry of comminuted argillaceous limestone material which, upon burning, produces cement, said slurry being sufficiently fluid to pump and containing a quantity of water otherwise insufficient for the purpose, said process comprising admixing with said argillaceous limestone material present in said slurry an alkali metal polyphosphate in an amount ranging from 0.003 per cent to 0.02 per cent, said percentages being by weight, based on the total weight of said slurry; from about 0.02 per cent to about 0.03 per cent by weight of a water-soluble methylene naphthalene sulfonate; and sodium carbonate, said sodium carbonate being present in amount sufficient to adjust the pH of the slurry to one within the range 6.5 to 9.5.

3. The process for the production of an aqueous slurry of comminuted argillaceous limestone material which, upon burning, produces cement, said slurry being sufficiently fluid to pump and containing a quantity of water otherwise insufficient for the purpose, said process comprising admixing with said argillaceous limestone material present in said slurry an alkali metal polyphosphate in an amount ranging from 0.003 per cent to 0.02 per cent, said percentages being by weight, based on the total weight of said slurry; from about 0.02 per cent to about 0.03 per cent by weight of a soluble methylene naphthalene sulfonate; about 0.01 per cent by weight of an alkali metal metasilicate; and sodium carbonate present in sufficient amount to adjust the pH of the slurry to one within the range 6.5 to 9.5.

4. The process for the production of an aqueous slurry of comminuted argillaceous limestone material which, upon burning, produces cement, said slurry being sufficiently fluid to pump and containing a quantity of water otherwise insufficient for the purpose, said process comprising admixing with said argillaceous limestone material present in said slurry an alkali metal polyphosphate in an amount ranging from about 0.003 per cent to about 0.02 per cent, a soluble methylene naphthalene sulfonate in an amount ranging from about 0.02 per cent to about 0.03 per cent, about 0.01 per cent of an alkali metal metasilicate, and sufficient sodium carbonate equal to about 0.01 per cent, to adjust the pH of the slurry to about 8.8, said percentages being by weight, based on the total weight of said slurry.

5. The process for the production of an aqueous slurry of comminuted argillaceous limestone material which, upon burning, produces cement, said slurry being sufficiently fluid to pump and containing a quantity of water otherwise insufficient for the purpose, said process comprising admixing with said argillaceous limestone material present in said slurry a sodium polyphosphate in an amount equal to about 0.003 per cent, based on the total weight of said slurry, from about 0.02 per cent to about 0.03 per cent by weight of a soluble salt of methylene naphthalene sulfonic acid, and sufficient sodium carbonate to adjust the pH of the slurry to one within the range 6.5 to 9.5.

6. The process for the production of an aqueous slurry of comminuted argillaceous limestone material which, upon burning, produces cement, said slurry being sufficiently fluid to pump and containing a quantity of water otherwise insufficient for the purpose, said process comprising admixing with said argillaceous limestone material present in said slurry a sodium polyphosphate in an amount equal to about 0.003 per cent based on the total weight of said slurry; from about 0.02 per cent to about 0.03 per cent by weight of a soluble salt of methylene naphthalene sulfonic acid; about 0.01 per cent by weight of an alkali metal metasilicate; and sufficient sodium carbonate to adjust the pH of the slurry to one within the range 6.5 to 9.5.

7. The process for the production of an aqueous slurry of comminuted argillaceous limestone material which, upon burning, produces cement, said slurry being sufficiently fluid to pump and containing a quantity of water otherwise insufficient for the purpose, said process comprising admixing with argillaceous limestone material present in said slurry an alkali metal polyphosphate in an amount ranging from about 0.003 per cent to about 0.1 per cent., said percentage being by weight, based on the total weight of said slurry.

References Cited in the file of this patent
UNITED STATES PATENTS

| | | |
|---|---|---|
| 1,438,588 | Feldenheimer | Dec. 12, 1922 |
| 2,004,545 | Wolf et al. | June 11, 1935 |
| 2,141,569 | Tucker | Dec. 27, 1938 |
| 2,162,525 | Breerwood | June 13, 1939 |
| 2,337,597 | Hall | Dec. 28, 1943 |
| 2,390,225 | Sherman | Dec. 4, 1945 |
| 2,493,809 | Garrison | Jan. 10, 1950 |
| 2,587,044 | Heilmann | Feb. 26, 1952 |

FOREIGN PATENTS

| | | |
|---|---|---|
| 524,513 | Great Britain | Aug. 8, 1940 |

OTHER REFERENCES

Budnikov et al., C. A., vol. 24, page 5962 (1930).
Moeller, T., "Inorganic Chemistry," John Wiley & Sons, Inc., New York (1952), page 645.